(12) United States Patent
Khakhalev et al.

(10) Patent No.: US 8,640,760 B2
(45) Date of Patent: Feb. 4, 2014

(54) ULTRASONIC WELDING MACHINE AND METHOD OF ALIGNING AN ULTRASONIC WELDING HORN RELATIVE TO AN ANVIL

(75) Inventors: Alex Khakhalev, San Diego, CA (US); Lee Nelson Cole, Leonard, MI (US); Eric Hicks, Oak Park, MI (US)

(73) Assignee: LG Chem, Ltd., Seoul (KR)

( * ) Notice: Subject to any disclaimer, the term of this patent is extended or adjusted under 35 U.S.C. 154(b) by 165 days.

(21) Appl. No.: 13/213,416

(22) Filed: Aug. 19, 2011

(65) Prior Publication Data
US 2013/0042959 A1    Feb. 21, 2013

(51) Int. Cl.
*B32B 37/06* (2006.01)

(52) U.S. Cl.
USPC .......................... 156/580.1; 228/1.1

(58) Field of Classification Search
USPC ........... 156/73.1, 580.1, 580.2; 264/442–445; 425/174.2; 228/110.1, 1.1; 310/323.18
See application file for complete search history.

(56) References Cited

U.S. PATENT DOCUMENTS

| | | | |
|---|---|---|---|
| 3,140,859 A | 7/1964 | Scarpa | |
| 4,294,392 A | 10/1981 | Colloff | |
| 4,767,492 A | 8/1988 | Fukusima et al. | |
| 5,357,423 A | 10/1994 | Weaver et al. | |
| 5,371,337 A | 12/1994 | Campbell et al. | |
| 5,603,444 A * | 2/1997 | Sato | 228/1.1 |
| 5,919,539 A * | 7/1999 | Bisbis et al. | 428/57 |
| 6,150,753 A | 11/2000 | Decastro | |
| 7,828,190 B2 * | 11/2010 | Saito et al. | 228/1.1 |
| 8,177,878 B2 | 5/2012 | Heinrich et al. | |
| 8,403,019 B2 * | 3/2013 | Khakhalev | 156/580.2 |
| 8,517,078 B1 * | 8/2013 | Johnston et al. | 156/580.2 |
| 2002/0031603 A1 | 3/2002 | Miyamoto et al. | |
| 2004/0023108 A1 | 2/2004 | Nakanishi et al. | |
| 2004/0247931 A1 | 12/2004 | Weihs et al. | |
| 2005/0202311 A1 | 9/2005 | Higashino et al. | |
| 2006/0174994 A1 | 8/2006 | White | |
| 2006/0225842 A1 | 10/2006 | Darcy et al. | |

(Continued)

FOREIGN PATENT DOCUMENTS

| | | |
|---|---|---|
| JP | 6114658 A | 4/1994 |
| JP | 7009169 A | 1/1995 |

(Continued)

OTHER PUBLICATIONS

U.S. Appl. No. 13/222,492, filed Aug. 31, 2011 entitled Interconnection Assemblies and Methods for Forming the Interconnection Assemblies in a Battery Module.

(Continued)

*Primary Examiner* — James Sells
(74) *Attorney, Agent, or Firm* — Buckert Patent & Trademark Law Firm, P.C.; John F. Buckert

(57) ABSTRACT

An ultrasonic welding machine and method are provided. The machine includes an ultrasonic welding horn operably coupled to a housing. The machine further includes an anvil operably coupled to the housing. The machine further includes a removable collar assembly that is coupled around a portion of an outer surface of the ultrasonic welding horn. The removable collar assembly has at least first and second set screws that contact the housing such that when at least one of the first and second set screws are moved inwardly toward the housing, the removable collar assembly rotates the ultrasonic welding horn to align the ultrasonic welding horn relative to the anvil.

7 Claims, 7 Drawing Sheets

(56) References Cited

U.S. PATENT DOCUMENTS

| | | |
|---|---|---|
| 2007/0257087 A1 | 11/2007 | Klinstein et al. |
| 2009/0111015 A1 | 4/2009 | Wood et al. |
| 2009/0255979 A1* | 10/2009 | Saito et al. ............. 228/1.1 |
| 2009/0297892 A1 | 12/2009 | Ijaz et al. |
| 2009/0297942 A1 | 12/2009 | Jang et al. |
| 2010/0038409 A1 | 2/2010 | Wilden et al. |
| 2010/0276086 A1 | 11/2010 | Oblak et al. |
| 2011/0108181 A1 | 5/2011 | Cai et al. |
| 2011/0114705 A1 | 5/2011 | Matis |
| 2011/0117420 A1 | 5/2011 | Kim et al. |
| 2011/0284169 A1* | 11/2011 | Khakhalev ............. 156/580.1 |
| 2011/0287300 A1 | 11/2011 | Byun et al. |
| 2011/0293992 A1 | 12/2011 | Hsu et al. |
| 2011/0300438 A1 | 12/2011 | Khakhalev |
| 2011/0308736 A1 | 12/2011 | Scheuerman et al. |
| 2012/0052364 A1 | 3/2012 | Khakhalev |
| 2012/0111924 A1 | 5/2012 | Makita et al. |
| 2012/0153006 A1 | 6/2012 | Koetting et al. |
| 2012/0158168 A1 | 6/2012 | Khakhalev |
| 2012/0180929 A1 | 7/2012 | Koetting et al. |
| 2013/0048698 A1 | 2/2013 | Khakhalev |

FOREIGN PATENT DOCUMENTS

| | | |
|---|---|---|
| JP | 2003165161 A | 6/2003 |
| JP | 2005503265 A | 2/2005 |
| JP | 2006212692 A | 8/2006 |
| KR | 20070104904 A | 10/2007 |
| KR | 20070109929 A | 11/2007 |
| WO | 9701432 A | 1/1997 |

OTHER PUBLICATIONS

U.S. Appl. No. 13/222,601, filed Aug. 31, 2011 entitled Ultrasonic Welding Machine and Method of Assembling the Ultrasonic Welding Machine.

International Search Report for International Application No. PCT/KR2011/003497 dated Jan. 9, 2012.

International Search Report for International Application No. PCT/KR2012/006222 dated Feb. 1, 2013.

U.S. Appl. No. 13/556,411, filed Jul. 24, 2012 entitled "Ultrasonic Welding Assembly and Method of Attaching an Anvil to a Bracket of the Assembly".

* cited by examiner

ULTRASONIC WELDING MACHINE AND METHOD OF ALIGNING AN ULTRASONIC WELDING HORN RELATIVE TO AN ANVIL

BACKGROUND

During installation of an ultrasonic welder, it is been a relatively difficult and time-consuming task to align an ultrasonic welding horn relative to an anvil.

The inventor herein has recognized a need for an improved ultrasonic welding machine and method that minimizes and/or eliminates the above-mentioned deficiency.

SUMMARY

An ultrasonic welding machine in accordance with an exemplary embodiment is provided. The ultrasonic welding machine includes an ultrasonic welding horn operably coupled to a housing. The ultrasonic welding machine further includes an anvil operably coupled to the housing. The ultrasonic welding machine further includes a removable collar assembly configured to be coupled around a portion of an outer surface of the ultrasonic welding horn. The removable collar assembly has at least first and second set screws that are configured to contact the housing. When at least one of the first and second set screws are moved inwardly toward the housing, the removable collar assembly rotates the ultrasonic welding horn to align the ultrasonic welding horn relative to the anvil.

A method for aligning an ultrasonic welding horn relative to an anvil in accordance with another exemplary embodiment is provided. The method includes coupling a removable collar assembly around a portion of an outer surface of the ultrasonic welding horn. The removable collar assembly has at least first and second set screws that are configured to contact the housing. The method further includes adjusting at least one of the first and second set screws inwardly toward the housing such that the removable collar assembly rotates the ultrasonic welding horn to align the ultrasonic welding horn relative to the anvil.

DETAILED DESCRIPTION

Figure 1:
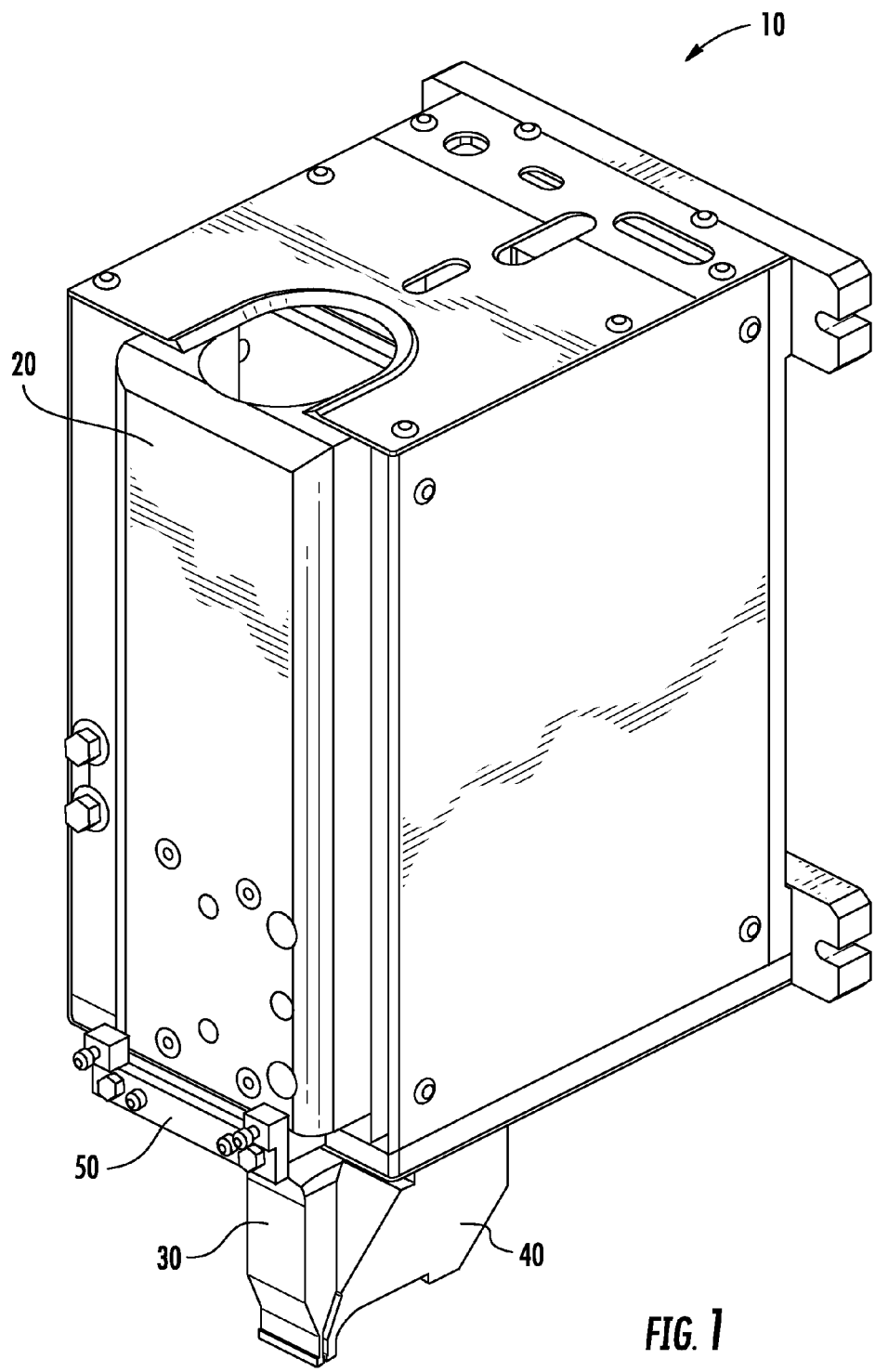
FIG. 1 is a schematic of an ultrasonic welding machine in accordance with an exemplary embodiment.
Figure 2:
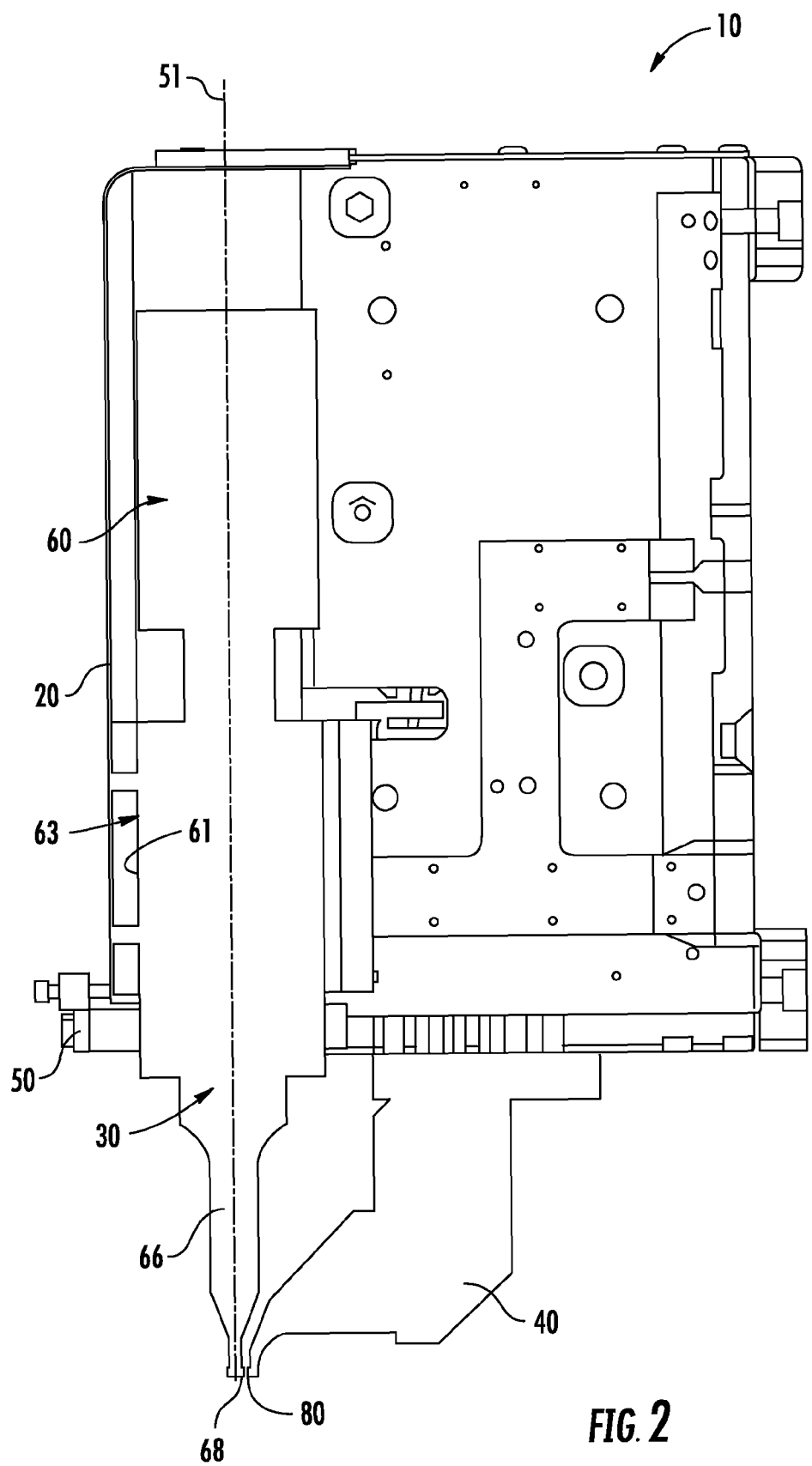
FIG. 2 is a side view of the ultrasonic welding machine of FIG. 1.

Referring to FIGS. 1 and 2, an ultrasonic welding machine 10 in accordance with an exemplary embodiment is provided. The ultrasonic welding machine 10 includes a housing 20, an ultrasonic welding horn 30, an anvil 40, and a removable collar assembly 50. An advantage of the machine 10 is that the machine 10 utilizes the removable collar assembly 50 to accurately align the ultrasonic welding horn 30 relative to the anvil 40. The ultrasonic welding horn 30 is aligned relative to the anvil 40 when a welding surface of the horn 30 is substantially parallel to a welding surface of the anvil 40.

Figure 3:
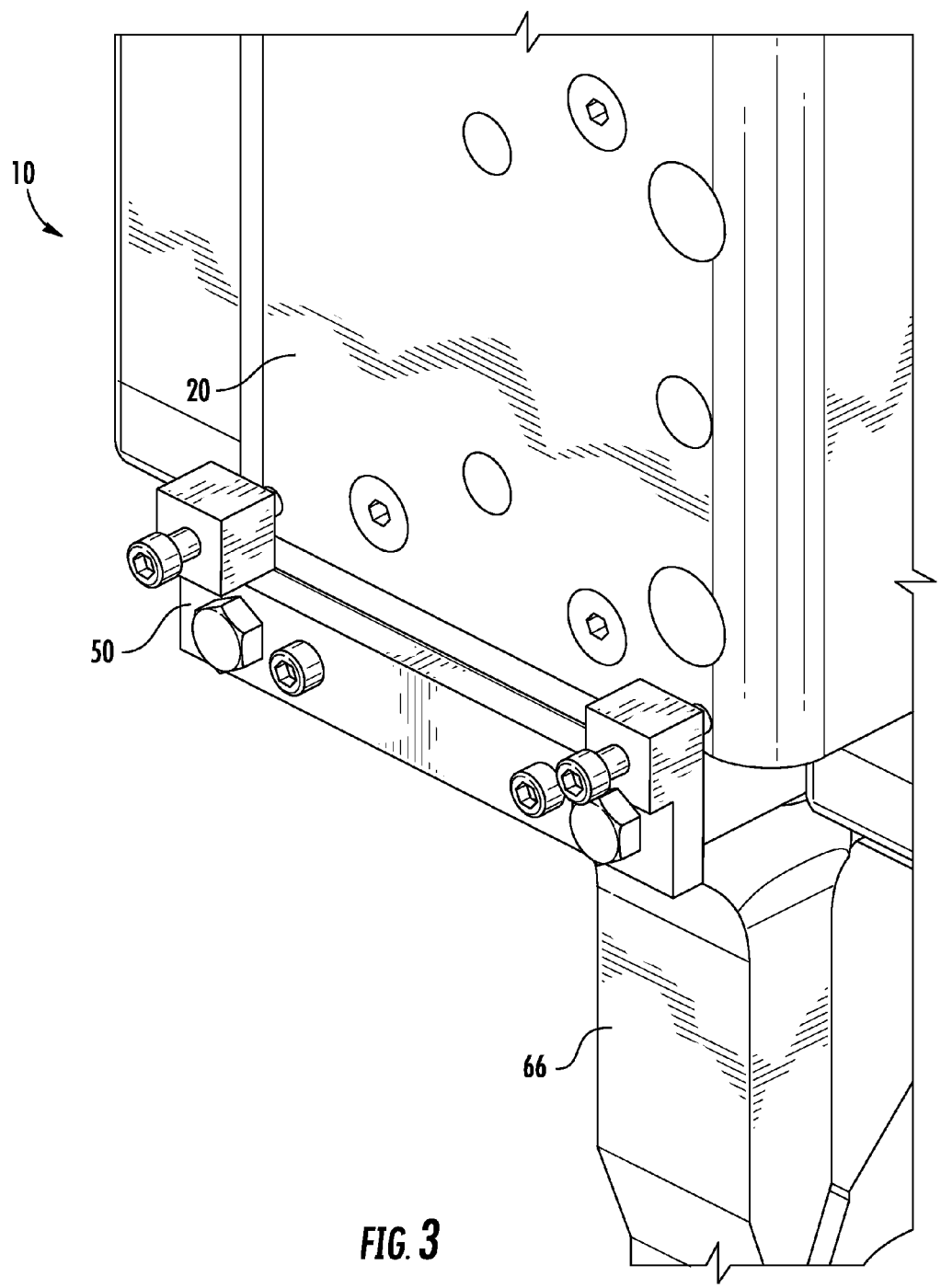
FIG. 3 is an enlarged view of a portion of the ultrasonic welding machine of FIG. 1.

Referring to FIGS. 2 and 3, the ultrasonic welding horn 30 includes a main body or convertor 60 and a welding tip portion 66 coupled to the main body 60. The main body 60 includes a booster housing 63 having an outer circumferential surface 61 and is disposed within the housing 20. The welding tip portion 66 is disposed outside of the booster housing 63 and has a welding surface 68. The main body 60 is configured to vibrate the welding tip portion 66 for forming weld joints on objects disposed between the welding tip portion 66 and the anvil 40.

The anvil 40 is coupled to the housing 20. The anvil 40 has a welding surface 80 disposed proximate to the welding surface 68 of the welding tip portion 66 of the ultrasonic welding horn 30.

Referring to FIGS. 2 and 4-7, a removable collar assembly 50 for aligning the ultrasonic welding horn 30 relative to the anvil 40 is illustrated. The removable collar assembly 50 is coupled to the outer surface 61 of the main body 60 of the ultrasonic welding horn 30. In particular, the removable collar assembly 50 is provided to rotate the ultrasonic welding horn 30 about a longitudinal axis 51 utilizing the set screws 114, 116 such that the ultrasonic welding horn 30 is aligned relative to the anvil 40. The removable collar assembly 50 includes a first body portion 90, a second body portion 92, a plate member 96, blocked members 98, 100, bolts 110, 112, the set screws 114, 116, and screws 118, 120.

The first body portion 90 is generally arcuate-shaped and defines an arcuate-shaped surface 130. The arcuate-shaped surface 130 has a radius substantially equal to a radius of the main body 60 of the ultrasonic welding horn 30 and is configured to abut against a portion of the outer surface 61 of the main body 60. The first body portion 90 includes apertures 132, 134 disposed therethrough for receiving a least a portion of the bolts 110, 112, respectively, therein. In one exemplary embodiment, the first body portion 90 is constructed of at least one of steel, stainless steel, and aluminum.

The second body portion 92 defines in arcuate-shaped surface 150 and a flat surface 151. The arcuate-shaped surface 150 has a radius substantially equal to a radius of the main body 60 of the ultrasonic welding horn 30 and is configured to abut against a portion of the outer surface 61 of the main body 60. The second body portion 92 includes apertures 152, 154 disposed therethrough, and an aperture 156 and another aperture (not shown) disposed therein. The apertures 152, 154 are configured to receive at least portions of the bolts 110, 112, respectively, therethrough. The aperture 156 and the other aperture (not shown) are configured to threadably receive at least a portion of the screws 118, 120, respectively, therein. In one exemplary embodiment, the second body portion 92 is constructed of at least one of steel, stainless steel, and aluminum.

The plate member 96 is configured to be coupled to the second body portion 92. In particular, the plate member 96 is disposed on the flat surface 151 of the second body portion 92. The plate member includes apertures 172, 174, 176, 178 extending therethrough. The aperture 172 is aligned with the aperture 152 of the second body member 92 and is configured to receive at least a portion of the bolt 110 therethrough. The aperture 174 is aligned with the aperture 154 of the second body member 92 and is configured to receive at least a portion of the bolt 112 therethrough. The aperture 176 is aligned with the aperture 156 of the second body member 92 and is configured to receive at least a portion of the screw 118 therethrough. The aperture 178 is aligned with a corresponding aperture of the second body member 92 and is configured to receive at least a portion of the screw 120 therethrough. In one exemplary embodiment, the plate member 96 is constructed of at least one of steel, stainless steel, and aluminum.

The block members 98, 100 are coupled on opposite end portions of the plate member 96. The block member 98 includes an aperture 190 extending therethrough that is configured to threadably receive a threaded end 232 of the set screw 114 therethrough. The block member 100 includes an aperture 192 extending therethrough that is configured to threadably receive a threaded end 242 of the set screw 116 therethrough. In one exemplary embodiment, the block members 98, 100 are constructed of at least one of steel, stainless steel, and aluminum.

Figure 4:
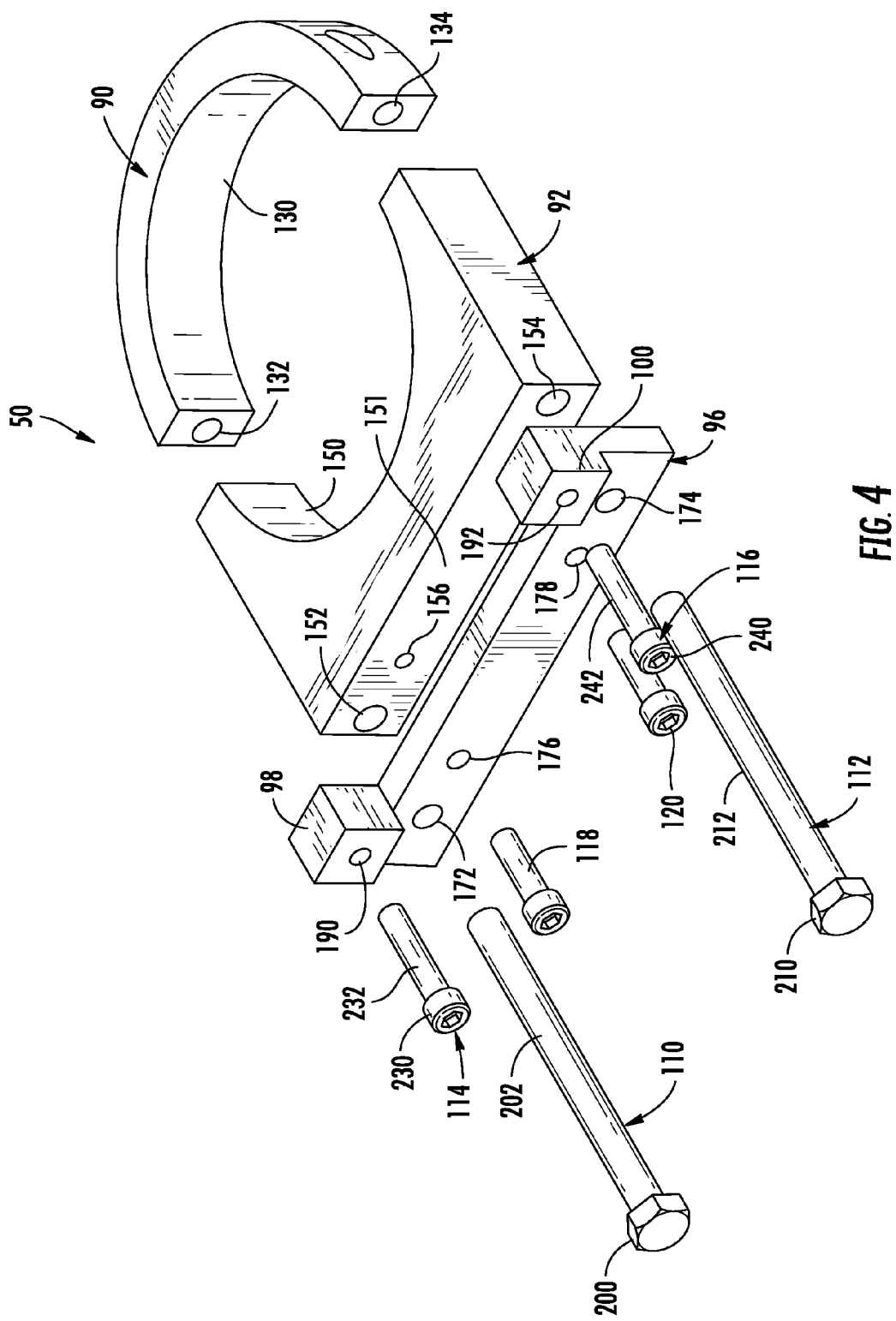
FIG. 4 is an exploded view of a removable collar assembly utilized in the ultrasonic welding machine of FIG. 1.
Figure 5:
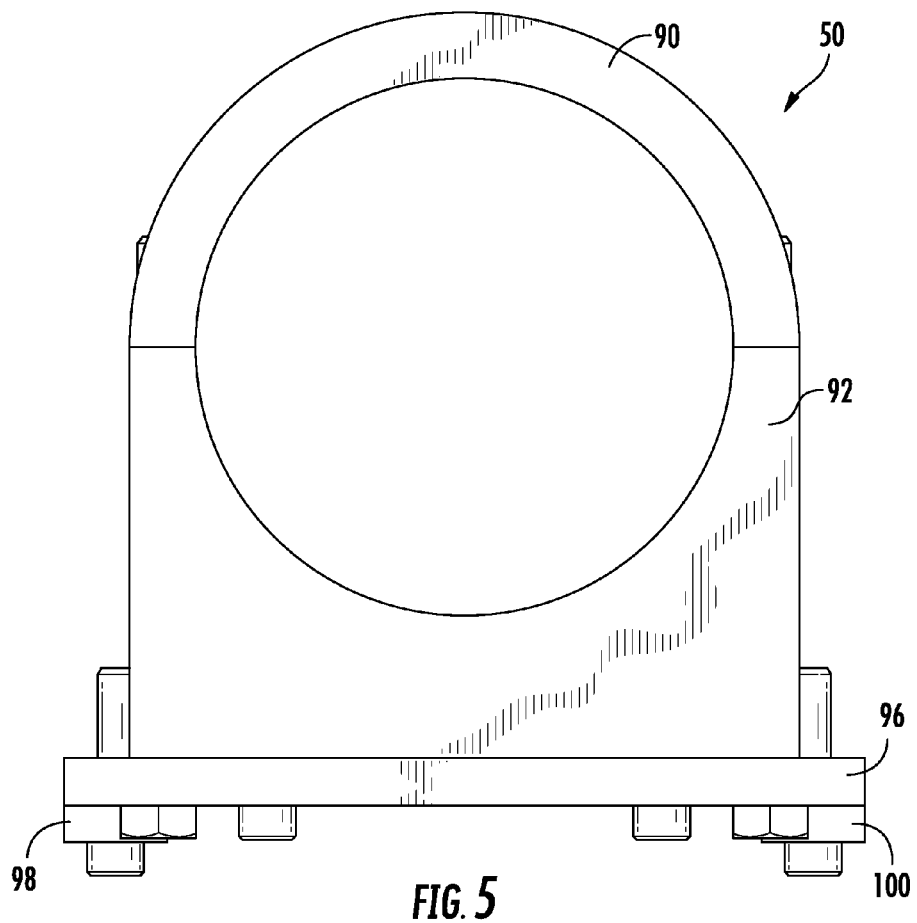
FIG. 5 is a bottom view of the removable collar assembly of FIG. 4.
Figure 6:
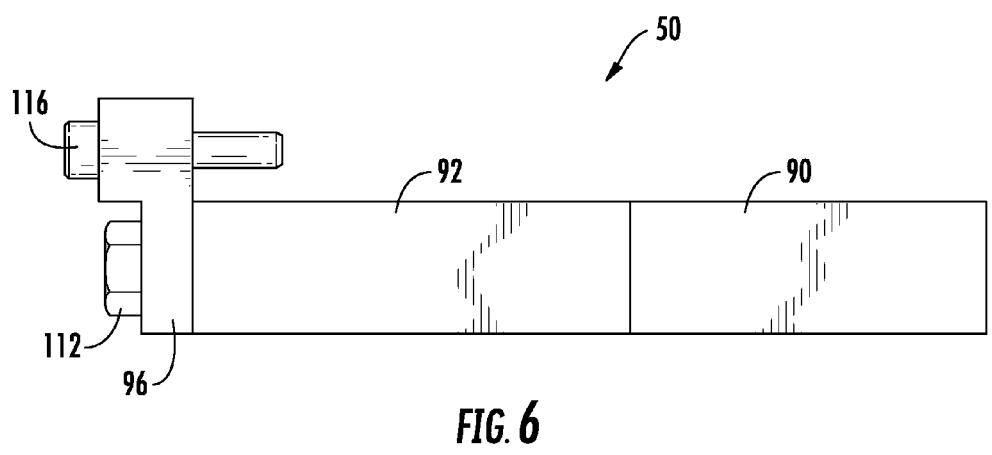
FIG. 6 is a side view of the removable collar assembly of FIG. 4.
Figure 7:
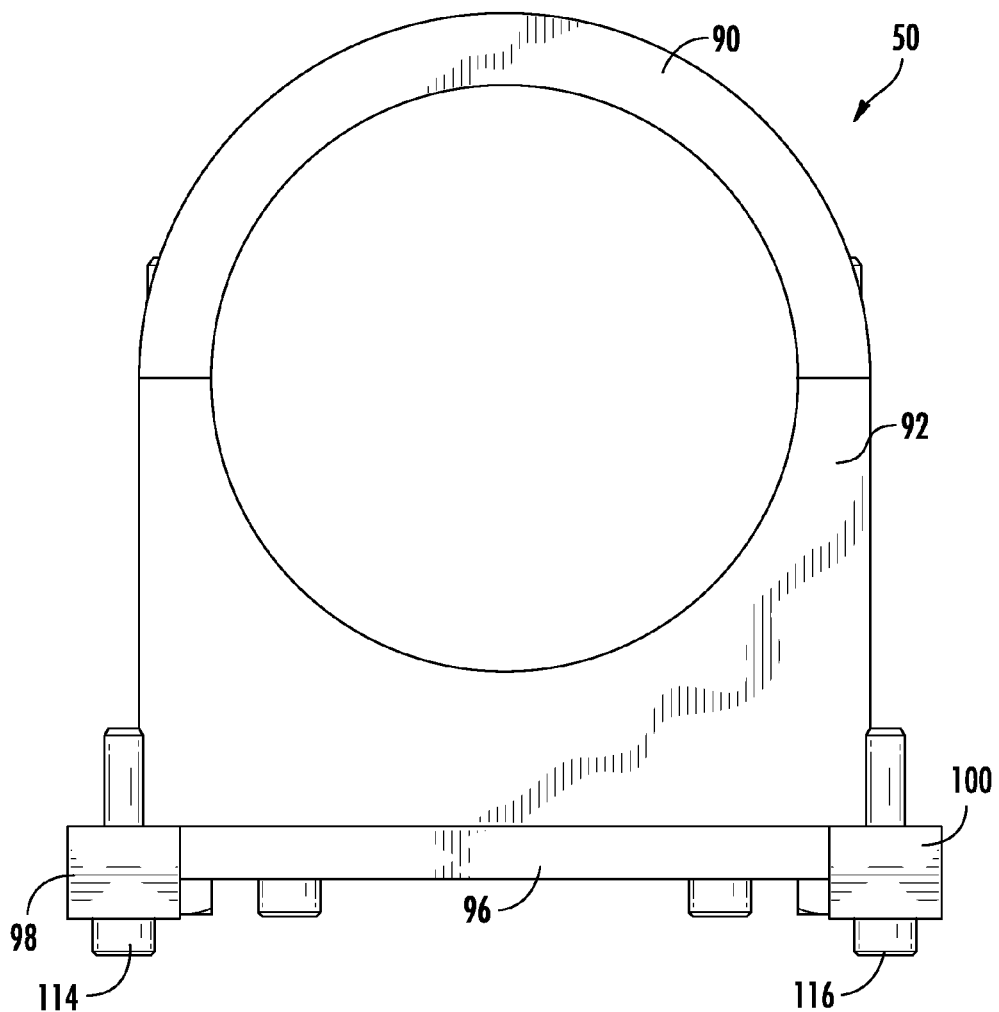
FIG. 7 is a top view of the removable collar assembly of FIG. 4.

Referring to FIG. 4, the bolt 110 includes a head 200 and a threaded end 202 coupled to the head 200. The threaded end 202 is configured to be inserted through the apertures 172, 152 and to be threadably received in the aperture 132. The bolt 112 includes a head 210 and a threaded end 212 coupled to the head 210. The threaded end 212 is configured to be inserted through the apertures 174, 154 and to be threadably received in the aperture 134.

The set screw 114 includes a head 230 and a threaded end 232 coupled to the head 230. The threaded end 232 is configured to be threadably received in the aperture 190 and an end of the threaded end 232 is configured to contact the an outer surface of the housing 20.

The set screw 116 includes a head 240 and a threaded end 242 coupled to the head 240. The threaded end 242 is configured to be threadably received in the aperture 192 and an end of the threaded end 242 is configured to contact an outer surface of the housing 20.

Figures 9, 10, 11:
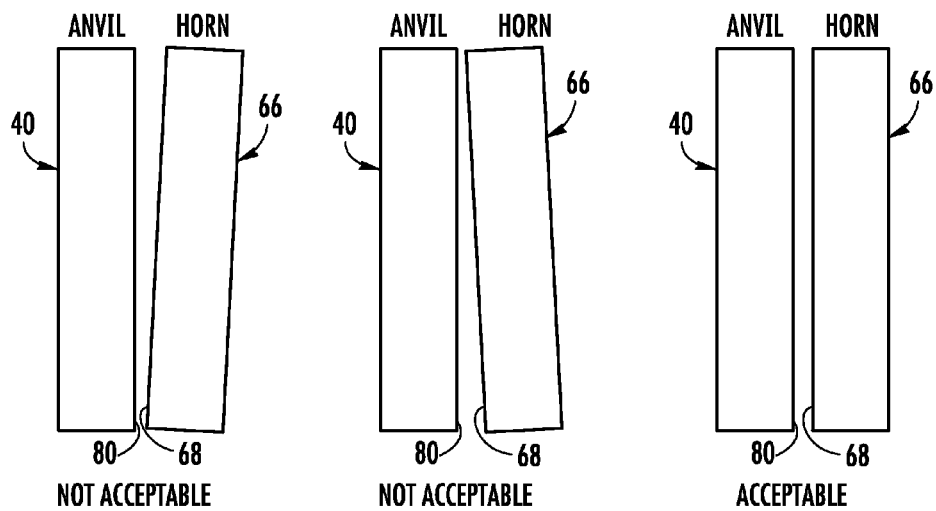
FIG. 9 is a simplified schematic of an ultrasonic welding horn that is misaligned with an anvil.
FIG. 10 is another simplified schematic of an ultrasonic welding horn that is misaligned with an anvil.
FIG. 11 is another simplified schematic of an ultrasonic welding horn that is aligned with an anvil.

Referring to FIGS. 9-11, a brief explanation of a desired alignment of the ultrasonic welding horn 30 relative to the anvil 40 and undesired alignments of the ultrasonic welding horn 30 relative to the anvil 40 will be provided. Referring to FIG. 9, the welding tip portion 66 has a welding surface 68 that is not substantially parallel to a welding surface 80 of the anvil 40, which is an undesired alignment. Similarly, referring to FIG. 10, the welding tip portion 66 has the welding surface 68 that is not substantially parallel to a welding surface 80 of the anvil 40, which is an undesired alignment. Referring to FIG. 11, the welding tip portion 66 has a welding surface 68 that is substantially parallel to the welding surface 80 of the anvil 40, which is a desired alignment.

Figure 8:
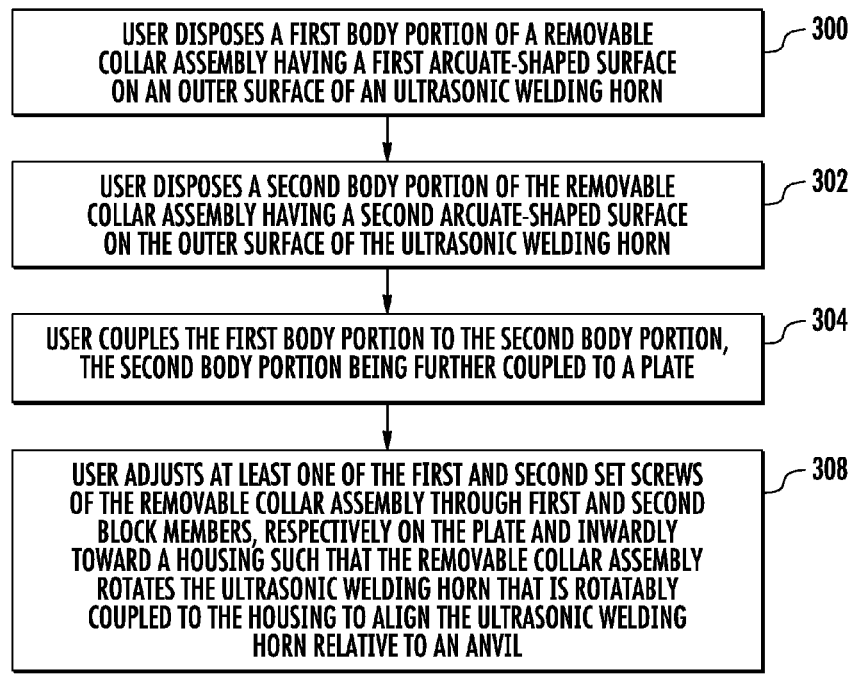
FIG. 8 is a flowchart of a method of aligning an ultrasonic welding horn relative to an anvil in accordance with another exemplary embodiment.

Referring to FIG. 8, a flowchart of a method of aligning the ultrasonic welding horn 30 relative to the anvil 40 in accordance with another exemplary embodiment is illustrated.

At step 300, a user disposes the first body portion 90 of the removable collar assembly 50 having a first arcuate-shaped surface 130 on the outer surface 61 of the ultrasonic welding horn 30.

At step 302, the user disposes the second body portion 92 of the removable collar assembly 50 having the second arcuate-shaped surface 150 on the outer surface 61 of the ultrasonic welding horn 30.

At step 304, the user couples the first body portion 90 to the second body portion 92. The second body portion 92 is further coupled to a plate 96.

At step 308, the user adjusts at least one of first and second set screws 114, 116 of the removable collar assembly 50 through block members 98, 100, respectively, on the plate 96 and inwardly toward the housing 20 such that the removable collar assembly 50 rotates the ultrasonic welding horn 30 about longitudinal axis 51 to align the ultrasonic welding horn 30 relative to the anvil 40. The ultrasonic welding horn 30 is rotatably coupled to the housing 20.

The ultrasonic welding machine and method of aligning an ultrasonic welding horn with an anvil provide a substantial advantage over other machines and methods. In particular, the ultrasonic welding machine and method provide a technical effect of utilizing a removable collar assembly to accurately align the ultrasonic welding horn with the anvil.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An ultrasonic welding machine, comprising:
an ultrasonic welding horn operably coupled to a housing
an anvil operably coupled to the housing; and
a removable collar assembly configured to be coupled around a portion of an outer surface of the ultrasonic welding horn, the removable collar assembly having at least first and second set screws that are configured to contact the housing such that when at least one of the first and second set screws are moved inwardly toward the housing, the removable collar assembly rotates the ultrasonic welding horn to align the ultrasonic welding horn relative to the anvil.

2. The ultrasonic welding machine of claim 1, wherein the removable collar assembly includes:
a first body portion defining a first arcuate-shaped surface; and
a second body portion defining a second arcuate-shaped surface, the second body portion being configured to be removably coupled to the first body portion, the first and second arcuate-shaped surfaces contacting the portion of the outer surface of the ultrasonic welding horn.

3. The ultrasonic welding machine of claim 2, further comprising:
a plate member and first and second block members coupled on opposite end portions of the plate member;
the plate member configured to be coupled to the second body portion; and
the first and second block members having first and second apertures configured to threadably receive the first and second set screws, respectively, therein.

4. The ultrasonic welding machine of claim 3, wherein the first body portion has third and fourth apertures extending therethrough, the second body portion having fifth and sixth apertures extending therethrough, and the plate member having seventh and eighth apertures extending therethrough.

5. The ultrasonic welding machine of claim 4, further comprising first and second bolts;
   the first bolt configured to be received within the third, fifth, and seventh apertures for coupling together the first body portion, the second body portion, and the plate member; and
   the second bolt configured to be received within the fourth, sixth and eighth apertures for coupling together the first body portion, the second body portion, and the plate member.

6. The ultrasonic welding machine of claim 3, wherein the first and second body portions and the plate member are constructed from at least one of steel, stainless steel, and aluminum.

7. The ultrasonic welding machine of claim 3, wherein the ultrasonic welding horn is aligned relative to the anvil when a welding surface of the ultrasonic welding horn is disposed substantially parallel to a welding surface of the anvil.

\* \* \* \* \*